Dec. 13, 1966  J. V. MURPHY  3,292,132
TEST JACK FOR PANEL MOUNTING
Filed Dec. 30, 1963  2 Sheets-Sheet 1
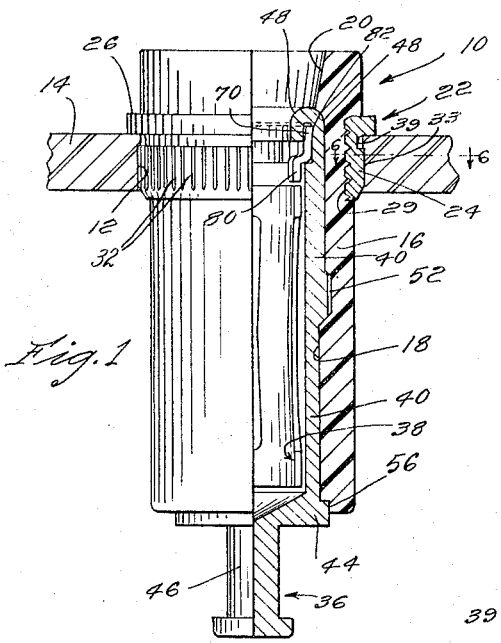
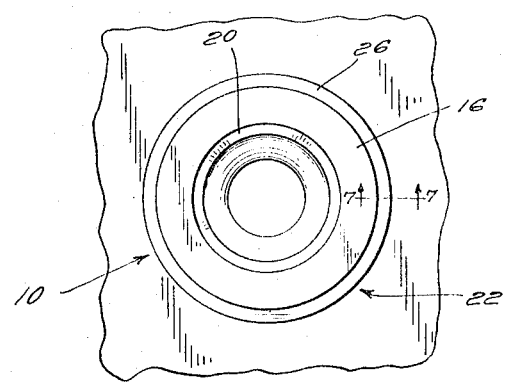
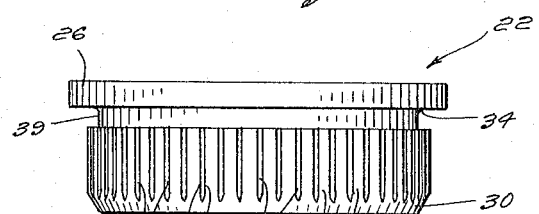
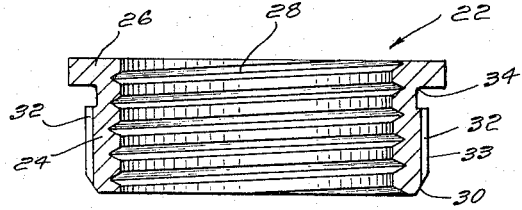
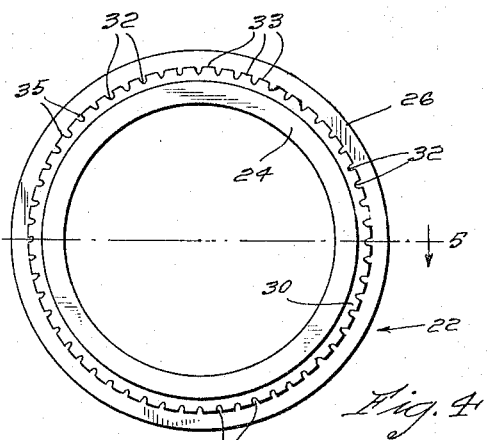
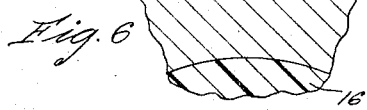
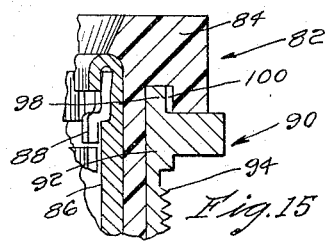
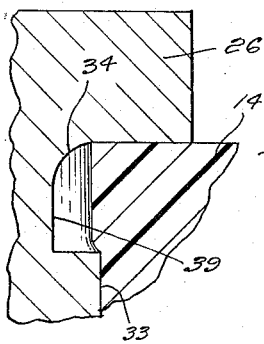
INVENTOR.
James V. Murphy
BY
Salter & Michaelson
Attorneys.

Dec. 13, 1966   J. V. MURPHY   3,292,132
TEST JACK FOR PANEL MOUNTING
Filed Dec. 30, 1963   2 Sheets-Sheet 2

INVENTOR.
James V. Murphy
BY
Salter & Michaelson
Attorneys

United States Patent Office 3,292,132
Patented Dec. 13, 1966

3,292,132
TEST JACK FOR PANEL MOUNTING
James V. Murphy, Warwick, R.I., assignor to Electronic Molding Corporation, Pawtucket, R.I., a corporation of Rhode Island
Filed Dec. 30, 1963, Ser. No. 334,403
5 Claims. (Cl. 339—126)

The present invention relates to a test jack for use in the testing of electrical apparatus. More particularly, the present invention relates to a test jack having a closed-entry contact embedded therein and including a novel locking element that enables the test jack to be secured in a panel opening as an integral unit and without the requirement of a separately attached lock member.

The present invention is adapted to be used in the testing of electronic apparatus wherein the circuitry of the appartaus is checked at predetermined points. In such testing procedures, it is the usual technique to electrically interconnect the test point to an instrument through a test jack that is mounted on a suitable panel or the like. Prior to the instant invention, it has been the practice to mount test jacks of the closed entry contact type, on the test panel by securing the body of the test jack in a panel opening through the interconnection of the test jack body and a separately attached securing element such as a threaded nut. These prior-known test jacks have found some disfavor in the trade since in the use thereof the separable parts oftentimes became loose, thereby causing the test jack to also become loose in the opening in which it was inserted.

In the use of a test jack, a male test probe is normally inserted into a closed entry contact, and it is seen that frequent inserting of the test probe and withdrawal thereof from the test jack could result in loosening of the test jack from its mounted position, particularly if separable securing nuts were employed in the securement of the test jack to the test panel as is commonly the practice in the prior-known constructions. The present invention avoids these prior difficulties, as discussed herein, by providing a test jack that is assembled in a one-piece construction and that is secured in the test panel by means of a novel locking element, the locking element insuring against any relative movement of the test jack with respect to the panel in which it is inserted. The unitary test jack of the present invention includes a contact member having an opening in which a contact sleeve for receiving a male conductor is secured. The contact sleeve is formed with a headed portion over which a reduced wall section of the contact member is folded for positive engagement of the contact sleeve within the contact member. Enveloping the contact member is a body portion that is formed of an insulating material, the body portion leaving exposed a terminal portion of the contact member that is adapted to be electrically connected to an externally located conductor. In order to mount the test jack in an opening formed in a test panel, a novel locking collar is provided and is secured to the external surface of the insulated body portion. The locking collar is further provided with an external surface having grooves formed therein, the grooves defining gripping areas that are adapted to engage the wall of the opening into which the test jack is inserted. Thus, portions of the wall of the opening flow into the grooves for effecting an interlock between the locking collar and the opening into which the test jack is inserted.

Accordingly, it is an object of the present invention to provide a test jack that is formed in a unitary assembly and that is adapted to be secured in a test panel for use in the testing of electrical apparatus.

Another object of the invention is to provide a test jack having an external locking element positively secured thereto that is adapted to interlock the test jack in an opening of a test panel.

Still another object is to provide a closed entry contact construction wherein a sleeve contact is positively secured to a contact member that is located interiorly of a body portion formed of an insulating material.

Still another object is to provide a unitary closed entry contact construction that is mounted in an opening formed in a test panel without the use of additional external locking means.

Other objects, features and advantages of the invention will become apparent as the description thereof proceeds when considered in connection with the accompanying illustrative drawings.

In the drawings which illustrate the best mode presently contemplated for carrying out the present invention:

FIG. 1 is a partial elevational and sectional view of the test jack embodied in the present invention and showing the mounted position thereof in a test panel;

FIG. 2 is a top elevational view of the test jack shown in FIG. 1;

FIG. 3 is a view in elevation of the locking collar that is part of the test jack assembly and that is employed for the locking thereof within an opening formed in a test panel;

FIG. 4 is a top plan view of the locking collar illustrated in FIG. 3;

FIG. 5 is a sectional view taken along lines 5—5 in FIG. 4;

FIG. 6 is a sectional view taken along lines 6—6 in FIG. 1;

FIG. 7 is a sectional view taken along lines 7—7 in FIG. 2;

FIG. 15 is a fragmentary sectional view showing a modified form of the locking collar.

Figure 8:
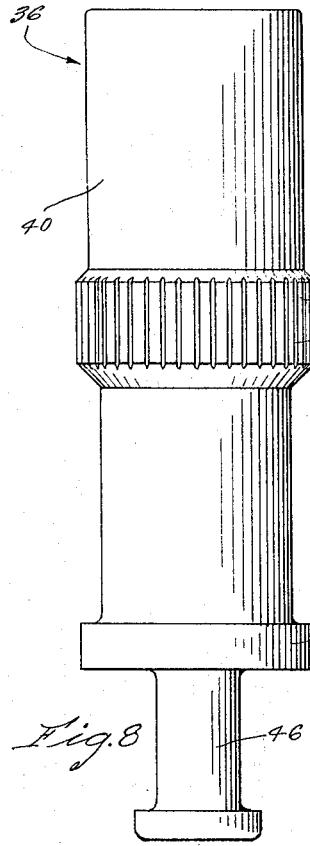
FIG. 8 is an elevational view of the contact member embodied in the present invention.

Referring now to the drawings and particularly to FIG. 1, the test jack assembly embodied in the present invention is generally indicated at 10, and as shown, is secured within an opening 12 formed in a test panel 14. It is understood that the test panel 14 may be mounted on any suitable test equipment and that it is contemplated that the test jack 10 will be utilized in the testing of electronic gear or apparatus wherein test points in the circuits of the electronic apparatus are checked. However, it is further contemplated that the test jack 10 may be employed wherever it is necessary or desirable to interconnect electrical connectors.

The test jack 10 is molded in a unitary assembly so that in the securement thereof within the opening 12 of the test panel 14, it is only necessary to press the test jack into the opening 12. In this form of the invention the use of external fittings and/or belts is avoided. The unitary assembly that defines the test jack 10 includes an external body portion 16 that is formed of an insulating material such as molded rubber, plastic and the like. The insulated body portion 16 has a central opening 18 formed therein that terminates at the upper end thereof, as seen in FIG. 1, in a flared mouth 20. Externally surrounding the insulated body portion 16 adjacent the end in which the flared mouth 20 is formed is a locking collar or eyelet generally indicated at 22. As shown in FIGS. 3 through 6, the locking collar 22 is defined by an annular wall 24 to which a flange 26 is integrally joined. Formed interiorly of the annular wall 24 are helical threads 28 (FIG. 5) that cooperate to lock the locking collar 22 on the body portion 16. As shown in FIG. 1, the body portion 16 is formed with an annular recess 29 the diameter of which is substantially equal to the inside diameter of the locking collar annular wall 24. Thus when the locking collar 22 is assembled with the body portion 16 during the molding of the latter it will be located within the recess 29 in interlocking engagement with the wall of the recess. In effect the wall of the recess 29 is molded to conform to the locking collar 22 that is secured thereto, the helical threads 28 insuring that a gripping action is effected between the engaging surfaces of the body portion 16 and the inside surface of the locking collar 22. The helical threads 28 further act to prevent twisting of the locking collar 22 on the body portion 16 during the assembly therebetween and also during insertion of the test jack assembly in the opening 12 of the panel 14. As further shown in FIG. 5, the end of the annular wall 24 opposite the flange 26 is chamfered or tapered as indicated at 30 so as to provide a lead-in surface for the test jack assembly when it is inserted into the opening 12 of the test panel 14.

Formed exteriorly of the annular wall 24 are a plurality of spaced channels or grooves 32 that extend in a direction that is generally parallel to the axis of the locking collar 22. The grooves 32 define gripping areas and, as shown in FIG. 6, are adapted to receive portions of the wall of the opening 12 that flow therein when the test jack is inserted in position in the opening 12. The grooves 32 thus form an interlock with the adjacent wall of the opening 12 and cooperate with the flange 26 that engages a surface of the panel 14, as illustrated in FIG. 1, to firmly and rigidly lock the test jack 10 within the opening 12 of the panel 14.

Referring again to FIG. 6, the grooves 32 are shown spaced around the periphery of the annular wall 24 and are separated by relatively flat lands or crest portions indicated at 33. The lands 33 cooperate with the grooves 32 to define cutting edges 35 that, in effect, cause adjacent portions or folds of the wall opening to be pressed into the grooves. These adjacent folded portions are indicated at 37 in FIG. 6. It is seen that by cresting the outer surface of the annular wall adjacent the grooves 32, a plurality of surfaces are provided that enable the jack test assembly to be smoothly pushed into the opening 12. Furthermore, the relatively wide crest portions or lands 33 produce sufficient pressure on the wall of the opening to cause the portions 37 to flow into the grooves 32.

Referring to FIG. 7, it will be noted that a fillet indicated at 34 interconnects the locking collar flange 26 to the annular wall 24 and is provided to add rigidity and to strengthen the flange 26. Since the flange 26 defines a stop for positively locating the test jack 10 within the opening 12 of the test panel 14, it is necessary that the flange 26 be as rigid as possible for resisting deformation when the test jack is inserted into the position as shown in FIG. 1. A plunger or the like will normally be utilized for inserting the test jack in position, and, thus, when the flange 26 is pushed into engagement with the panel 14, the added strength created by addition of the fillet 14 will act to prevent deformation of the flange when the lead is applied thereto from the inserting plunger.

It will be further noted in FIG. 7 that a portion 39 of the annular wall 24 adjacent the fillet 34 is recessed with respect to the lands 33. This undercut or recess 39 cooperates with the grooves 32 and lands 33 to form a lock with the wall of the opening 12 that is caused to flow therein when the test jack assembly is pushed into the opening. Thus not only does the wall of the opening 12 flow into the grooves 32 as indicated at 37 but further is received within the recess 39 to form an interlock therewith.

Figure 9:
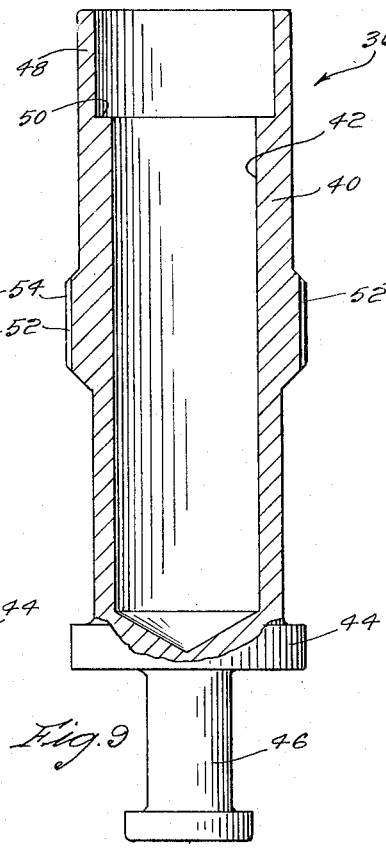
FIG. 9 is a vertical sectional view of the contact member illustrated in FIG. 8 with parts shown in elevation.
Figure 10:
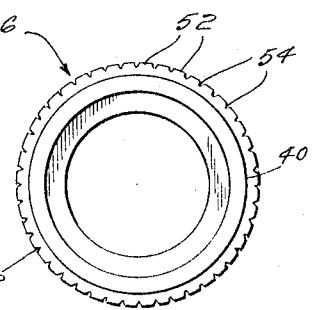
FIG. 10 is a top plan view of the contact member shown in FIGS. 8 and 9.

Referring now to FIGS. 8, 9 and 10, a contact member generally indicated at 36 is illustrated and, as will be described, cooperates with a contact sleeve generally indicated at 38 and shown in FIGS. 12–14 to form a closed-entry contact. The contact member 36 includes a body portion 40 in which a central bore or opening 42 is formed. Joined to the closed end of the body 40 is a flange 44 to which an outwardly extending terminal 46 is joined. The terminal 46 is known in the trade as a turret-type contact terminal and is only one of several types of terminals that may be used for securement to an external conductor. The wall of the body portion 40 opposite the flange 44 is reduced in cross section as indicated at 48 to define an annular shoulder 50, the reduced wall 48 providing for the folding thereof into intimate engagement with a head portion of the contact sleeve 38 as will be described hereinafter. The junction of the reduced outer wall 48 with the body portion 40 of the contact member 36 which defines the annular shoulder 50 is also adapted to receive a component part of the contact sleeve 38 with assembly thereof to the contact member 36. Formed intermediate the ends of the body portion 40 of the contact member 36 is an annular raised portion 52 in the outer surface of which longitudinally extending striations or grooves 54 are formed. As shown in FIG. 1, the contact member 36 is located within the body portion 16 of the test jack and is fixed in position therein during the molding of the body portion. By providing the annular raised portion 52 on the contact member 36, and forming the grooves 54 therein, a gripping area is defined that engages the inner surface of the body portion 16 so as to form a positive lock between the molded body portion 16 and the contact member 36. It will be further noted in FIG. 1 that the end of the body portion 16 opposite the flared mouth 20 is formed with an annular recess 56, the annular recess 56 being shaped and proportioned for receiving a portion of the flange 44 therein when the body portion 16 is molded around the contact member 36. Thus the interaction of the recess 56 and the flange 44 further cooperates with the annular portion 52 to positively locate the body portion 16 on the contact member 36.

Figure 12:
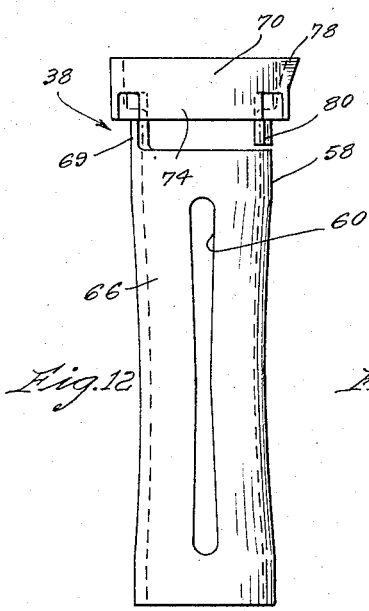
FIG. 12 is an elevational view of the contact sleeve that is secured within the contact member.
Figure 13:
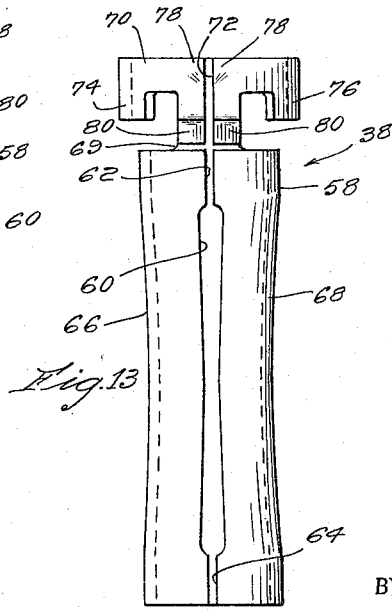
FIG. 13 is an elevational view of the contact sleeve but rotated 90° from the position shown in FIG. 12.
Figure 14:
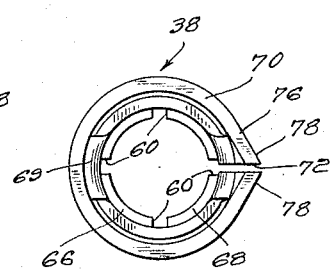
FIG. 14 is a top plan view of the contact sleeve illustrated in FIGS. 12 and 13.

Referring now to FIGS. 12, 13 and 14, the contact sleeve 38 is illustrated in detail, and as shown, includes a tubular element 58 in which longitudinally extending slots 60 are formed in spaced-apart relation. The slots 60 are located approximately 90° apart, two of the slots 60 that are disposed in opposed relation further communicating with smaller opposed slots 62 and 64 at the ends thereof to effectively separate the body portion 58 into semi-circular segments 66 and 68. As shown in FIGS. 12 and 13, the segments 66 and 68 are inwardly bowed somewhat and cooperate to essentially produce an hourglass configuration that defines an interior restriction. By reason of the separation between the segments 66–68 and further because of the slots 60 formed in each segment, a spring action of the segments is produced that insures that when a male probe is inserted within the contact sleeve, it will be received with a positive gripping action. Joined to an outer edge of the segments 66, 68 adjacent the slot 62 is a neck strip 69 to which a head member 70 is connected. The head member 70 is annular in configuration and is separated by a slot 72 that is in alignment with the slots 62, 64. Joined to the head member 70 are arcuate flanges 74 and 76 and formed on the head member adjacent the slot 72 are ears 78 that, as will be described, are provided for biting into the reduced wall 48 of the contact member 36 when the reduced wall is folded in overlapping relation over the head member 70. A second neck strip 80 is secured to the head member 70 but is separated from the tubular element 58 as is illustrated in FIG. 12.

Figure 11:
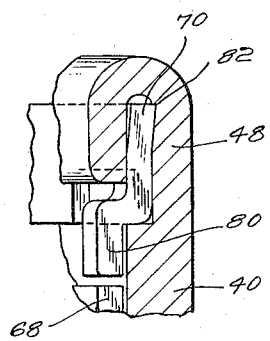
FIG. 11 is an enlarged fragmentary sectional view of the assembly of the contact member with its contact sleeve secured therein.

In the securement of the contact sleeve 38 within the contact member 36, the tubular element 58 is received within the bore or opening 42 of the contact member 36. As shown in FIG. 11, the annular head member 70 engages the shoulder 50 in the contact member 36 and is disposed in engaging relation with the interior surface of the reduced wall 48. With the contact sleeve 38 located within the opening 12 of the contact member 36, the outer portion of the reduced wall 48 is rolled or folded in overlapping relation with respect to the annular head member 70. When the reduced wall 48 is rolled into engaging relation with the annular head member 70, the ears 78 are forced to bite into the interior surface of the wall 48, thereby interlocking therewith and insuring positive engagement between the contact sleeve 38 and the contact member 36. Referring to FIG. 11, the indentation produced by the biting of the ears 78 into the interior surface of the reduced wall 48 is indicated at 82.

In the assembly of the test jack 10, the contact sleeve 38 is secured within the contact member 36, and the body portion 16 of insulating material is then molded in enveloping relation around the contact member 36. During the molding operation the locking collar 22 is fixed on the exterior surface of the body portion 16 in adjacent relation with respect to the end of the body portion in which the flared mouth 20 is formed. The contact member 36 further defines a protective shield for the contact sleeve 38 during the molding of the body portion 16 around the contact member. Thus the contact member prevents the plastic material from running into the spring contact sleeve 38 and preserves the spring action therein that is essential for the successful operation of the test jack. It is seen, therefore, that the contact member 36 not only serves to facilitate the molding of the body portion 16 therearound in proper relation but further cooperates with the preassembled spring contact sleeve 38 to insure the proper operation thereof.

Assuming that the test jack 10 is to be mounted on a test panel, the opening 12 is formed in the panel 14 by any suitable drilling tool or punch. The diameter of the opening 12 is dimensioned such that it is slightly less than the outer diameter of the annular wall 24 of the locking collar 22. A plunger or loading tool is then employed for insertion of the test jack 10 within the opening 12, the chamfered edge 30 of the locking collar 32 acting as a lead-in into the opening 12 for simplifying the insertion of the test jack therein. The test jack is then moved through the opening 12 until the flange 26 of the locking collar 22 strikes the adjacent surface of the test panel 14. Since the grooves or channels 32 are disposed in tight friction fitting relation with respect to the wall of the opening 12, portions of the wall will tend to flow into the grooves or channels 32 to produce an effective locking action. This action is shown particularly in FIG. 6. Since the test jack is now firmly locked in place in the test panel 14, additional securing elements such as threaded nuts or the like are not required, and it is seen that the only means for securing the test jack in place in the test panel is the unique constructional arrangement of the locking collar 22 that is formed as an assembled part of the test jack assembly. Thus the terminal or test jack is pressed securely into position in a single operation. The interior location of the contact member 36 and the contact sleeve 38 that define the closed entry contact eliminates the possibility of damage during insertion of the test jack and further guards against damaging contact with an oversized test probe. The press-in feature of the test jack eliminates awkward rear panel assembly, and the small outside diameter and overall length of the test jack enable it to be utilized wherever minimum space requirements are necessary. The test jack is rugged in construction and is highly reliable in operation and electrical communication between the probe inserted into the contact sleeve 38 and the terminal 46 is assured.

In certain instances, it may be desirable to utilize an external fastening device for securing the test jack to the test panel. In this event, a modified locking collar would be employed such as shown in FIG. 15. As seen in FIG. 15 a test jack generally indicated at 82 includes a molded body portion 84 in which a contact member 86 and contact sleeve 88 are fixed in the manner as described above. In order to mount the test jack 82 on a panel, a locking collar generally indicated at 90 is provided and is fixed to the exterior surface of the body portion 16 during the molding operation. The locking collar 90 includes an elongated annular body 92, only a portion of which is shown in FIG. 15 and on the exterior surface of which threads 94 are formed for receiving a lock nut (not shown). A locating flange 96 is formed as an extension of the body 92; and integrally joined to the body 92 adjacent the flange 96 is a reduced neck section 98 in the outer surface of which a plurality of spaced grooves 100 are formed. The spaced grooves 100 receive the adjacent portions of the body portion 84 therein during the molding operation and thus act to effect a locking action between the locking collar and the body portion 84. The grooves 100 further tend to prevent twisting of the locking collar 90 with respect to the body portion 84 and thus define anti-twsit means during the mounting and use of the test jack 82 on a test panel.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In a test jack for insertion into an opening formed in a panel, a contact member having a raised annular portion formed thereon intermediate the ends thereof and a turret joined to one end thereof, a contact sleeve located within said contact member and including an annular head member that is fixed to the end of the contact member that is opposite the turret, a body portion formed of an insulating material and enveloping a major portion of said contact member, the turret of said terminal being exposed for electrical interconnection to an externally located conductor, and a locking collar secured to said body portion, said locking collar including a flange and a plurality of grooves that define an interrupted surface, said interrupted surface being pressed into said opening, wherein portions of the panel surrounding said opening flow into the grooves defining the interrupted surface, said flange engaging the surface of said panel adjacent said opening and cooperating with said interrupted surface to positively lock said test jack in said panel opening.

2. In a test jack for use with the testing of electrical apparatus wherein said test jack is mounted in an opening that is formed in a test panel, a contact member having a central opening formed therein and including an extension that is joined thereto for securement to an external conductor, a contact sleeve located within the central opening of said contact member and being adapted to receive a male test prong therein, wherein electrical communication is established between said male prong and said extension, a tubular body portion of insulating material enveloping said contact member with the exception of said extension that projects therebeyond, and a securing collar of annular configuration mounted on said body portion and being shaped and proportioned for force fitting into said opening to positively lock said test jack therein, said contact member including an annular raised portion formed on the outer surface thereof and intermediate the ends thereof, the exterior surface of said raised portion being interrupted to define a gripping surface that is adapted to frictionally engage the interior surface of said tubular body portion that envelops said contact member.

3. In a test jack for insertion into an opening formed in a panel, a cylindrical contact member having an extension joined to one end thereof, a contact sleeve located within said cylindrical contact member, a body portion formed of an insulating material and enveloping a major portion of said contact member, the extension of said contact member being exposed for electrical interconnection with an externally located conductor, and a locking collar fixed on said body portion and including an annular flange and having a plurality of grooves formed thereon that define an interrupted outer surface, the diameter of said locking collar in which the grooves are formed being slightly greater than that of the opening in the panel so that upon insertion of said locking collar into said opening, portions of the panel surrounding said opening flow into the grooves that define the interrupted surface, said flange engaging the surface of said panel adjacent said opening and cooperating with said interrupted surface to positively lock said test jack in said panel opening.

4. In a test jack as set forth in claim 3, the grooves formed in said locking collar extending in a direction that is parallel to the longitudinal axis of said locking collar, said grooves being spaced apart around the body of said locking collar to define a plurality of lands, the function of said grooves and lands forming cutting edges that cooperate to cause portions of the wall of said opening in said panel to flow into said grooves.

5. In a test jack as set forth in claim 3, said contact sleeve including a head portion and a body portion that is joined to said head portion, said head portion being formed with an annular portion, said cylindrical contact member being formed with an end that is reduced in cross section with respect to the remainder of said contact member, said reduced end of said contact member being rolled and bent into intimate engagement with the annular portion of the head portion of said contact sleeve to secure said contact sleeve within said contact member.

References Cited by the Examiner

UNITED STATES PATENTS

| | | | |
|---|---|---|---|
| 2,306,389 | 12/1942 | Jorgensen | 339—221 X |
| 2,700,144 | 1/1955 | Flanagan | 339—126 X |
| 2,701,869 | 2/1955 | Hobson | 339—193 |
| 2,918,521 | 12/1959 | Abrams | 174—152 |
| 2,958,065 | 10/1960 | Flanagan. | |
| 3,093,887 | 6/1963 | Prestigee et al. | 339—221 |
| 3,120,989 | 2/1964 | Solorow et al. | 339—256 |
| 3,168,366 | 2/1965 | Fuller | 339—220 |
| 3,208,027 | 9/1965 | Johnson | 339—17 |

EDWARD C. ALLEN, *Primary Examiner.*

ALFRED S. TRASK, *Examiner.*